(12) United States Patent
Kuroishi et al.

(10) Patent No.: US 9,286,555 B2
(45) Date of Patent: Mar. 15, 2016

(54) INFORMATION PROCESSING DEVICE, INFORMATION PROCESSING METHOD, AND IMAGE PROCESSING DEVICE

(71) Applicant: FUJI XEROX CO., LTD, Minato-ku, Tokyo (JP)

(72) Inventors: Kenji Kuroishi, Kanagawa (JP); Tsutomu Nakaminato, Kanagawa (JP); Masafumi Ono, Kanagawa (JP); Motofumi Baba, Kanagawa (JP); Keiko Shiraishi, Kanagawa (JP); Yuri Takeuchi, Kanagawa (JP); Koichi Azuma, Kanagawa (JP); Kazuhiko Narushima, Kanagawa (JP); Hidenori Horie, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/271,623

(22) Filed: May 7, 2014

(65) Prior Publication Data

US 2015/0022837 A1 Jan. 22, 2015

(30) Foreign Application Priority Data

Jul. 18, 2013 (JP) .................................. 2013-149733

(51) Int. Cl.
*G06F 3/12* (2006.01)
*G06K 15/00* (2006.01)
*H04N 1/00* (2006.01)
*G06F 1/26* (2006.01)

(52) U.S. Cl.
CPC .............. *G06K 15/4055* (2013.01); *G06F 1/26* (2013.01); *H04N 1/00896* (2013.01)

(58) Field of Classification Search
None
See application file for complete search history.

(56) References Cited

U.S. PATENT DOCUMENTS

| 6,161,187 | A | * | 12/2000 | Mason | G06F 1/3228 326/98 |
| 7,800,577 | B2 | * | 9/2010 | Kerofsky | G09G 3/3406 345/102 |
| 8,724,132 | B2 | * | 5/2014 | Nozawa | G03G 15/5004 358/1.14 |
| 2007/0260358 | A1 | * | 11/2007 | Katoh | B41J 29/393 700/286 |
| 2009/0110427 | A1 | * | 4/2009 | Ishizuka | B41J 3/46 399/88 |
| 2011/0286027 | A1 | * | 11/2011 | Nozawa | G03G 15/5004 358/1.14 |
| 2012/0204046 | A1 | * | 8/2012 | Baba | G06F 1/3231 713/323 |
| 2012/0224206 | A1 | * | 9/2012 | Takahashi | G06F 3/1229 358/1.13 |
| 2012/0320404 | A1 | * | 12/2012 | Raja | H04N 1/00408 358/1.15 |

FOREIGN PATENT DOCUMENTS

AU 2003208008 A1 9/2003
JP 3944088 B2 7/2007

\* cited by examiner

*Primary Examiner* — Marcus T Riley
(74) *Attorney, Agent, or Firm* — Sughrue Mion, PLLC

(57) ABSTRACT

An information processing device includes a computing unit and a display unit. The computing unit computes a power consumption per a predetermined time during a power saving mode that reduces power consumption, on the basis of a count per type of an interrupt signal produced during the power saving mode, and a power consumption pre-estimated per type of the interrupt signal. The display unit displays a power consumption computed by the computing unit using generated or stored electric power.

10 Claims, 7 Drawing Sheets

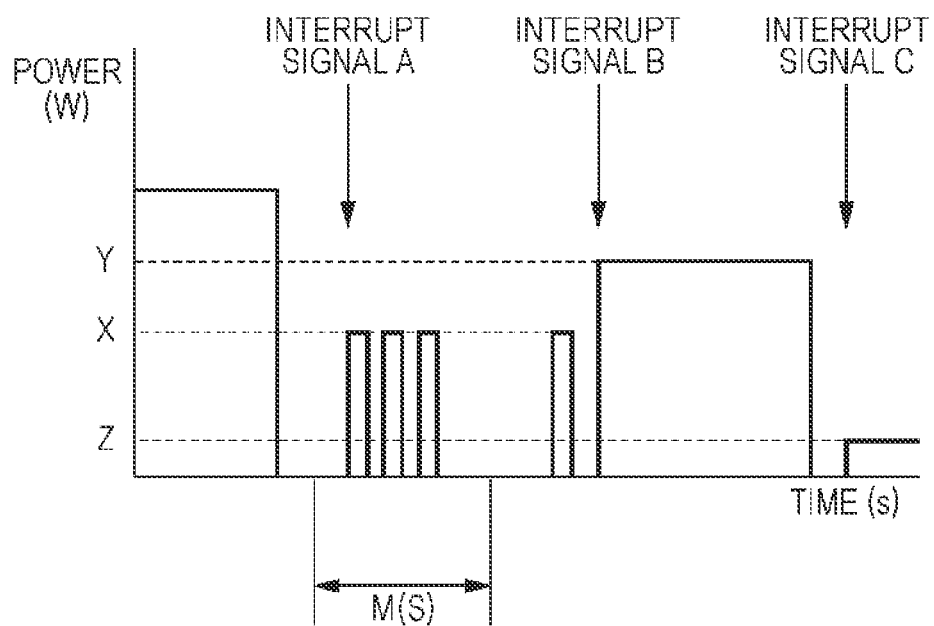

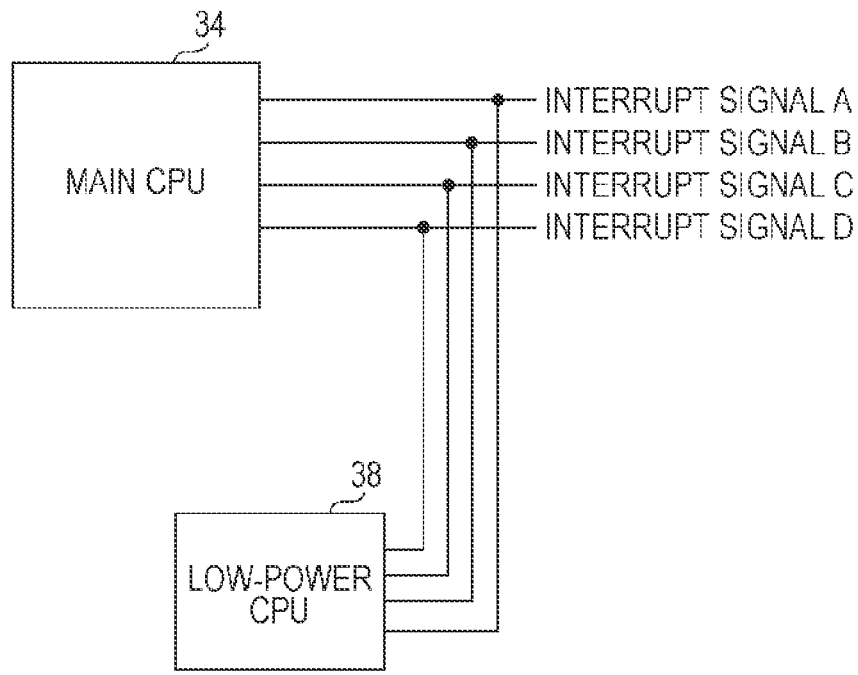
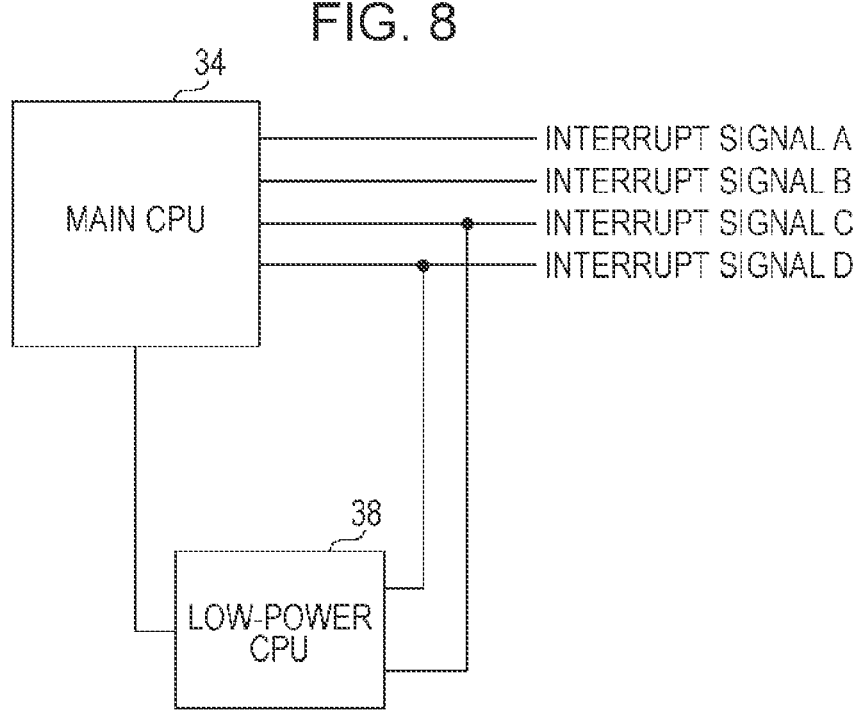

INFORMATION PROCESSING DEVICE, INFORMATION PROCESSING METHOD, AND IMAGE PROCESSING DEVICE

CROSS-REFERENCE TO RELATED APPLICATIONS

This application is based on and claims priority under 35 USC 119 from Japanese Patent Application No. 2013-149733 filed Jul. 18, 2013.

BACKGROUND

1. Technical Field

The present invention relates to an information processing device, an information processing method, and an image processing device.

2. Summary

According to an aspect of the invention, there is provided an information processing device that includes a computing unit and a display unit. The computing unit computes a power consumption per a predetermined time during a power saving mode that reduces power consumption, on the basis of a count per type of an interrupt signal produced during the power saving mode, and a power consumption pre-estimated per type of the interrupt signal. The display unit displays a power consumption computed by the computing unit using generated or stored electric power.

BRIEF DESCRIPTION OF THE DRAWINGS

An exemplary embodiment of the present invention will be described in detail based on the following figures, wherein:

FIG. 6A is a diagram illustrating an example of the types and number of interrupt signals, while FIG. 6B is a diagram illustrating an example of a table expressing an electric power value and duration estimated for each type of interrupt signal;

FIG. 7 is a diagram for explaining a second electric power value computation method that computes an electric power value during a power saving mode; and FIG. 8 is a diagram for explaining a third electric power value computation method that computes an electric power value during a power saving mode.

DETAILED DESCRIPTION

Hereinafter, an exemplary embodiment of the present invention will be described with reference to the drawings. Members that exhibit the same action and functionality are denoted with the same signs throughout all drawings, and duplicate description thereof may be reduced or omitted in some cases.

Figure 1:
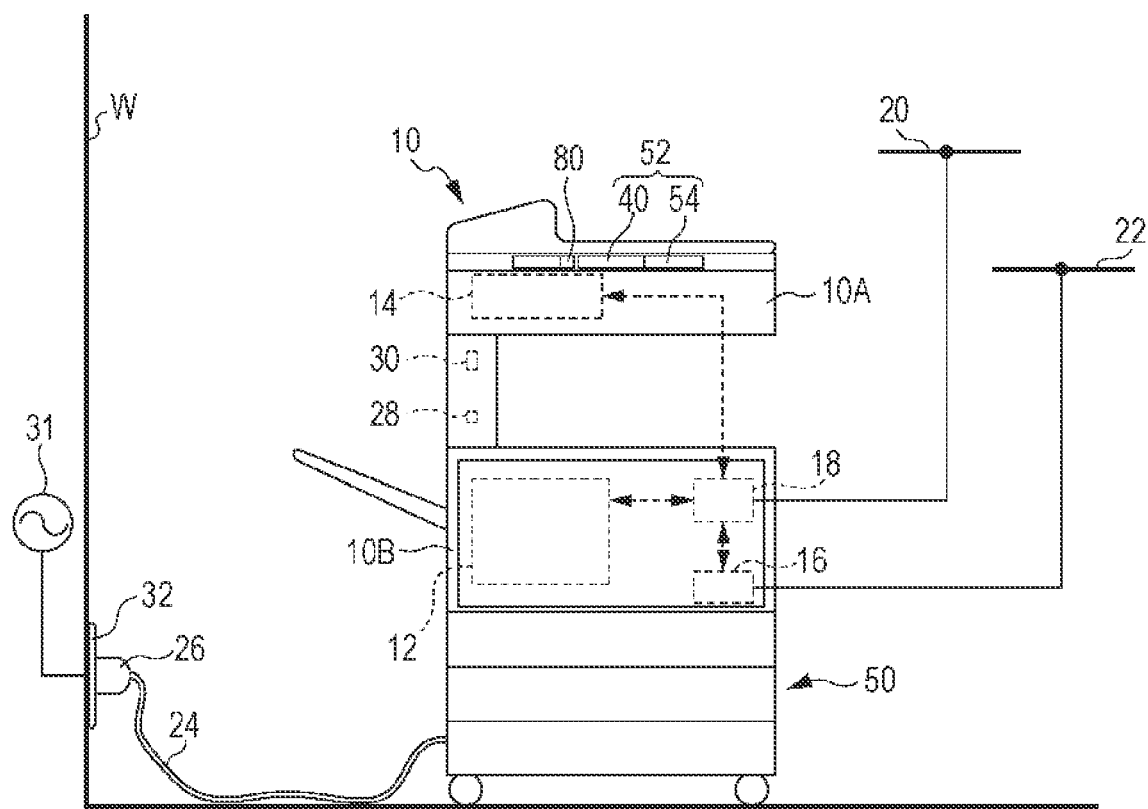
FIG. 1 is a diagram illustrating a schematic configuration of an image processing device according to an exemplary embodiment of the present invention.

FIG. 1 is a diagram illustrating a schematic configuration of an image processing device 10 according to an exemplary embodiment of the present invention.

The image processing device 10 is equipped with an image forming unit 12 that forms an image on a printing sheet, an image reading unit 14 that reads a document image, and a facsimile communication control circuit 16. The image processing device 10 is equipped with a main controller 18, which controls the image forming unit 12, the image reading unit 14, and the facsimile communication control circuit 16. For example, the main controller 18 temporarily stores image data of a document image read by the image reading unit 14, and transmits the read image data to the image forming unit 12 or the facsimile communication control circuit 16. Note that the image reading unit 14 is covered by an upper housing 10A, while the image forming unit 12, the facsimile communication control circuit 16, and the main controller 18 are covered by a lower housing 10B. The lower housing 10B is additionally provided with a multi-level tray unit 50 that houses printing sheets.

Additionally, on the upper front of the upper housing 10A that covers the image reading unit 14, there is placed a user interface 52 (hereinafter called the "UI 52" in some cases), which is used to specify processing operation (service) items that include at least one of an image reading process, a copying process, an image forming process, and a transmitting/receiving process, to specify advanced settings for each processing operation, and also to display the state of the image processing device 10. The UI 52 is provided with a touch panel 40 with which an instruction may be given by touching a display screen with the operator's finger or the like, and multiple hardware keys 54 with which an instruction may be given via mechanical operation (for example, a pressing operation) (see FIG. 2).

A network communication link 20 such as the Internet is connected to the main controller 18, and a telephone line 22 is connected to the facsimile communication control circuit 16. The main controller 18 is connected to a host computer via the network communication link 20, for example, and includes the roles of receiving image data, and transmitting or receiving facsimiles using the telephone line 22 via the facsimile communication control circuit 16.

The image reading unit 14 is provided with a document receptacle that positions a document, a scanning subsystem that scans an image of and radiates light onto a document placed in the document receptacle, and a photoelectric transducer such as a CCD that senses light reflected or transmitted by the scanning of the scanning subsystem, and converts sensed light into an electrical signal.

The image forming unit 12 is equipped with a photoreceptor. Around the photoreceptor, there are provided a charging device that uniformly charges the photoreceptor, a scanning exposure unit that causes a light beam to scan on the basis of image data, an image developer that develops an electrostatic latent image formed by the scanning exposure conducted by the scanning exposure unit, a transfer unit that transfers a developed image on the photoreceptor to a printing sheet, and a cleaning unit that cleans the surface of the photoreceptor after transfer. In addition, on the transport path of the printing sheet, there is provided a fuser that fuses the transferred image onto the printing sheet.

In the image processing device 10, a plug 26 is attached to the end of an input power line 24. By inserting this plug 26 into an outlet plate 32 of an electric utility 31 wired into a wall face W, the image processing device 10 becomes able to receive a supply of electric power from the electric utility 31.

Figure 2:
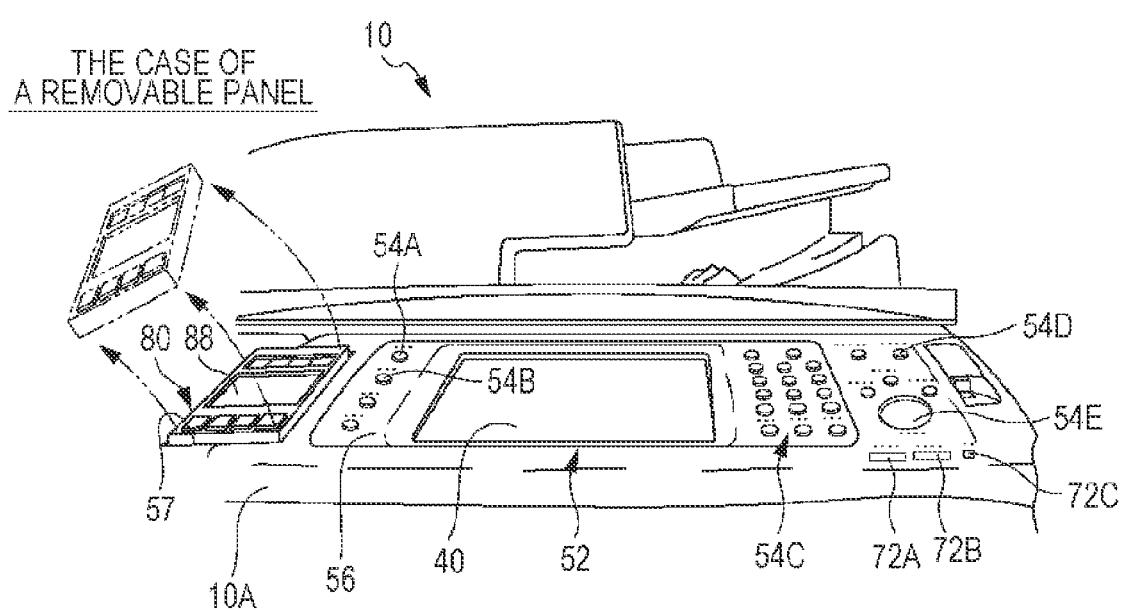
FIG. 2 is an enlarged view of the area near a UI in an image processing device according to an exemplary embodiment of the present invention.

As illustrated in FIG. 2, the UI 52 installed in the upper housing 10A is provided on a plate 56 made of a separate member than the upper housing 10A. The touch panel 40 is placed in the central area of the plate 56. Additionally, multiple hardware keys 54A to 54E are exposed on the surface of the plate 56 to the left and right of the touch panel 40 as seen in FIG. 2.

The hardware keys 54A to 54E are for finalizing predetermined instruction information determined with respective pressing operations. For example, in the example of FIG. 2, there are provided a menu key 54A for switching the display screen of the touch panel 40 to a home screen, a copy key 54B for specifying copying, a keypad 54C for specifying a number of copies or inputting a security code, a power saving key 54D for specifying or canceling power saving, and a start key 54E for specifying the execution of a process.

Also, at the lower-right of the plate 56 as seen in FIG. 2, near the start key 54E, monitor LEDs are provided, including an LED 72A that indicates when data is being transmitted, an LED 72B that indicates an error has occurred, and an LED 72C that indicates that the image processing device 10 is powered on.

Meanwhile, on the left side of the plate 56 as seen in FIG. 2, a sub panel 80 is provided. In the present exemplary embodiment, the sub panel 80 is housed in a rectangular depression 57 provided on the upper housing 10A.

The sub panel 80 is provided with a display 88 on the surface of a cover member that covers the entire sub panel 80 (as illustrated in FIG. 2, the display 88 faces upward when the sub panel 80 is housed in the depression 57).

Note that this sub panel 80 may be affixed and housed in the depression 57, or be freely removable (see the imaginary lines in FIG. 2). Also, in the case of a removable sub panel 80, the wiring system that corresponds to a bus 33E (see FIG. 3) that administers information communication with the image processing device 10 may be wired or wireless.

In addition, the attach position of the sub panel 80 is not limited to the above. The sub panel 80 may be attached anywhere, obviously including the area near the UI 52, but also including the upper housing 10A and the lower housing 10B. A position easy to see for a user may be selected. Also, in the case of structuring the sub panel 80 to be removable, multiple docking locations may be provided.

Also, in the present exemplary embodiment, the reason for separating the UI 52 and the sub panel 80 is because the source supplying electric power differs. In the present exemplary embodiment, in the case in which a predetermined amount of time elapses and an operation or operating instruction is not given to the image processing device 10, in order to reduce power consumption, power supply to respective components is shut off under control of the main controller 18, and the image processing device 10 switches to a power saving mode that suspends operation of the main controller 18. At this point, the UI 52 may also be suspended, since the UI 52 receives power supply from the electric utility 31 and presents displays related to normal settings and image processing and the like, attempting to make the UI 52 run and display the power consumption during the power saving mode would not lower the power consumption. In contrast, the sub panel 80 does not receive power supply from the electric utility 31, but instead uses generated or stored power to display the power consumption during power saving mode and notify the user. For this reason, the sub panel 80 is suited to presenting a display of power consumption and the like during power saving mode.

Figure 3:
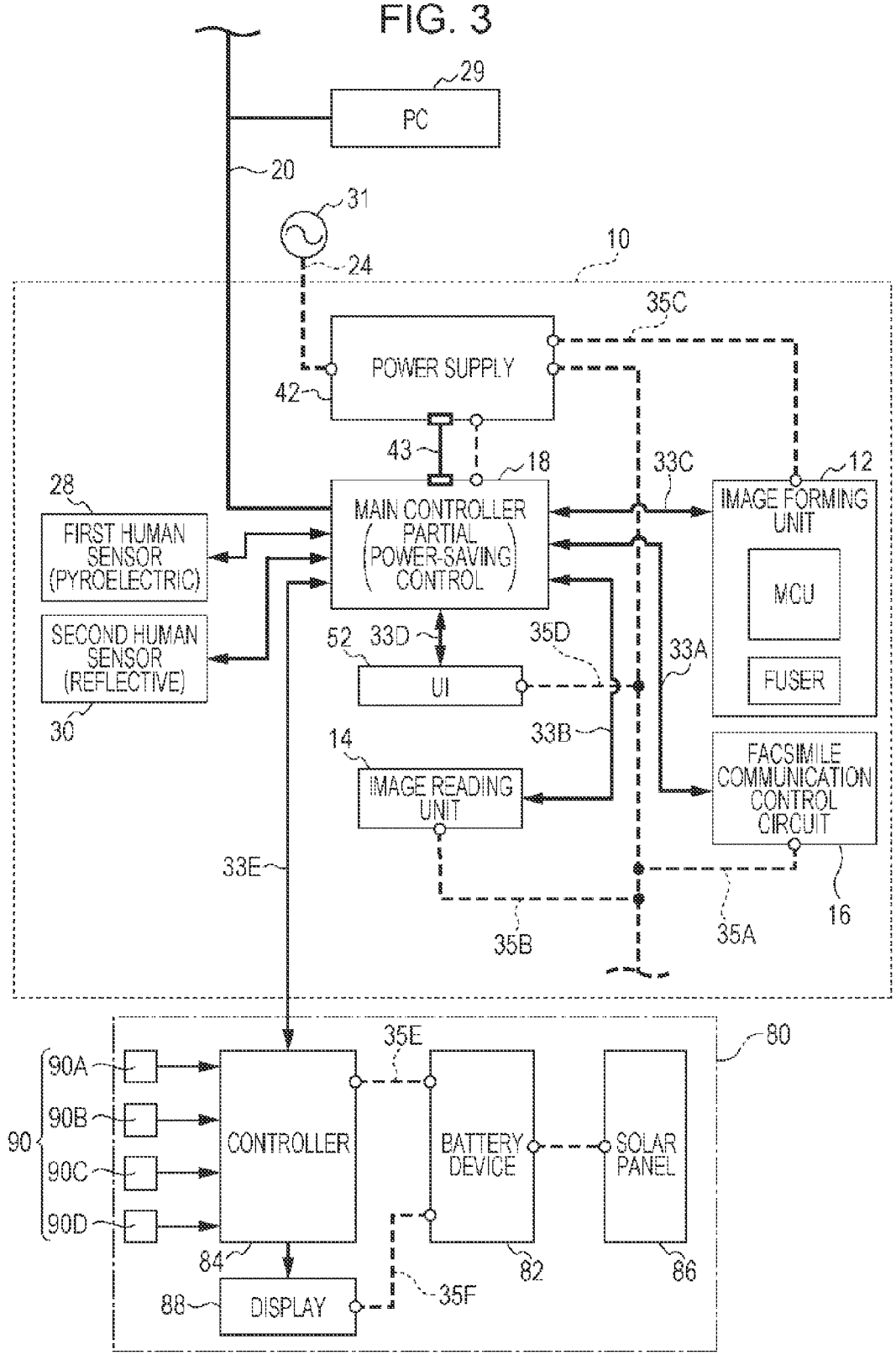
FIG. 3 is a block diagram illustrating a hardware configuration of the control subsystem of an image processing device according to an exemplary embodiment of the present invention.

Next, a configuration of the control subsystem of the image processing device 10 will be described. FIG. 3 is a block diagram illustrating a hardware configuration of the control subsystem of the image processing device 10 according to an exemplary embodiment of the present invention.

The network communication link 20 is connected to the main controller 18 of the image processing device 10. Note that a personal computer (PC) 29 that may act as a transmission source of image data or the like is connected to the network communication link 20.

The facsimile communication control circuit 16, the image reading unit 14, the image forming unit 12, and the UI 52 are respectively connected to the main controller 18 via busses 33A to 33D, which are data busses and control busses or the like. In other words, the main controller 18 is the agent, and each processing unit of the image processing device 10 is controlled thereby.

In addition, a first human sensor 28 and a second human sensor 30 are connected to the main controller 18, and the two human sensors monitor the presence or absence of people near the image processing device 10.

In the present exemplary embodiment, by installing the first human sensor 28 and the second human sensor 30, and by using the first human sensor 28 and the second human sensor 30 to sense a user and quickly resume power supply before the user presses a power saving cancel button, the user is able to use the image processing device 10 sooner. More specifically, power is routed to the second human sensor 30 in the case of the first human sensor 28 sensing a person, and when the second human sensor 30 senses the person, the operation of the main controller 18 is resumed, and the image processing device 10 returns from power saving mode.

Note that although a power saving cancel button as well as the first human sensor 28 and the second human sensor 30 are jointly used, full monitoring is also possible with only the first human sensor 28 and the second human sensor 30.

In addition, the designation of the first human sensor 28 and the second human sensor 30 as "human" sensors is a proper noun in accordance with the present exemplary embodiment, and refers to a sensor capable of at least sensing (detecting) a person. In other words, a "human" sensor also encompasses sensors that sense (detect) moving objects other than people. Consequently, although the following discusses a "person" as the detection target of the first human sensor 28 and the second human sensor 30, in the future, a robot or the like that executes actions instead of a person is also a potential target of sensing. Note that conversely, in the case of a special sensor able to identify and sense people, that special sensor is also applicable. Hereinafter, a moving object, person, user, or the like will be treated as synonymous targets of detection by the first human sensor 28 and the second human sensor 30, and will be distinguished as appropriate.

Furthermore, in the present exemplary embodiment, a pyroelectric sensor is implemented as the first human sensor 28, and a reflective sensor is implemented as the second human sensor 30. However, the sensor types are not limited thereto.

Also, the main controller 18 of the present exemplary embodiment is connected to a controller 84 of the sub panel 80 via a bus 33E.

The image processing device 10 is equipped with a power supply 42, which is connected to the main controller 18 by a signal harness 43.

The power supply 42 is connected to the electric utility 31 by the input power line 24, and is configured to receive a supply of electric power from the electric utility 31 via the input power line 24.

The power supply 42 is provided with power supply lines 35A to 35E that independently supply electric power to each of the main controller 18, the facsimile communication control circuit 16, the image reading unit 14, the image forming unit 12, and the UI 52. For this reason, the main controller 18 capable of what is termed partial power saving control by individually supplying power (power supply mode) or shutting off power supply (power saving mode) to each processing unit (device).

In other words, among the components of the image processing device 10, the facsimile communication control circuit 16 may continually monitor the reception status. Meanwhile, with the image reading unit 14 and the image forming unit 12, if there is no processing operation (service) execution instruction, power supply may be shut off rather than continually maintaining a standby state as the operating mode, for example, thereby reducing power consumption compared to maintaining the operating mode.

Furthermore, the touch panel 40 of the UI 52 (see FIG. 2) is subjected to a touch operation when a user is facing the UI 52 of the image processing device 10. When a user is not present in front of the image processing device 10, it is also possible to turn off a backlight (not illustrated) placed behind the touch panel 40.

As illustrated in FIG. 3, the sub panel 80 is provided with an independent battery device 82, which is connected to the controller 84 via a power supply line 35E. The battery device 82 is charged by solar power with a solar panel 86.

In addition, the sub panel 80 is provided with a display 88 that operates under control by the controller 84, and operating keys 90 (in the present exemplary embodiment, four independent operating keys 90A to 90D) for giving minimal instructions, such as adjusting the display state on the display 88. In the present exemplary embodiment, the display 88 is configured to receive electric power from the battery device 82 via a power supply line 35F, but may also be configured to receive electric power from the controller 84.

Note that the operating keys 90 may be omitted. In addition, a liquid crystal display device without a backlight is implemented as the display 88 to achieve the minimum power consumption conceivable at present, but depending on the battery capacity of the battery device 82 or the power generating performance of the solar panel 86, a display 88 with a backlight or an LED display may be used. Furthermore, the display 88 may also be a touch panel equipped with operable functionality.

As above, the sub panel 80 does not receive power supply from the image processing device 10, but operates on electric power received from an independent power source (battery device 82), and functions as an information display device that displays information (such as electric power value information) on the display 88 on the basis of operational information received from the main controller 18 via the bus 33E (including execution information and operating mode (status) information for each device, for example).

Namely, the controller 84 of the sub panel 80 stores electric power count values for each device (image reading unit 14, UI 52, main controller 18, and image forming unit 12) in advance, and computes an electric power value on the basis of operational information for each device received from the main controller 18 via the bus 33E, and the electric power count values. The display 88 displays an electric power value based on the computed result.

On the other hand, although the sub panel 80 computes an electric power value on the basis of operational information obtained from the main controller 18 as above, during power saving mode, the main controller 18 is suspended, and thus operational information may be unavailable. At this point, if the main controller 18 is activated in order to obtain operational information, power consumption may increase.

Accordingly, in power saving mode, the present exemplary embodiment is configured to sense the number of times that past examples that raise electric power periodically occur, and compute an electric power value on the basis of the type and number of past examples.

Figure 4:
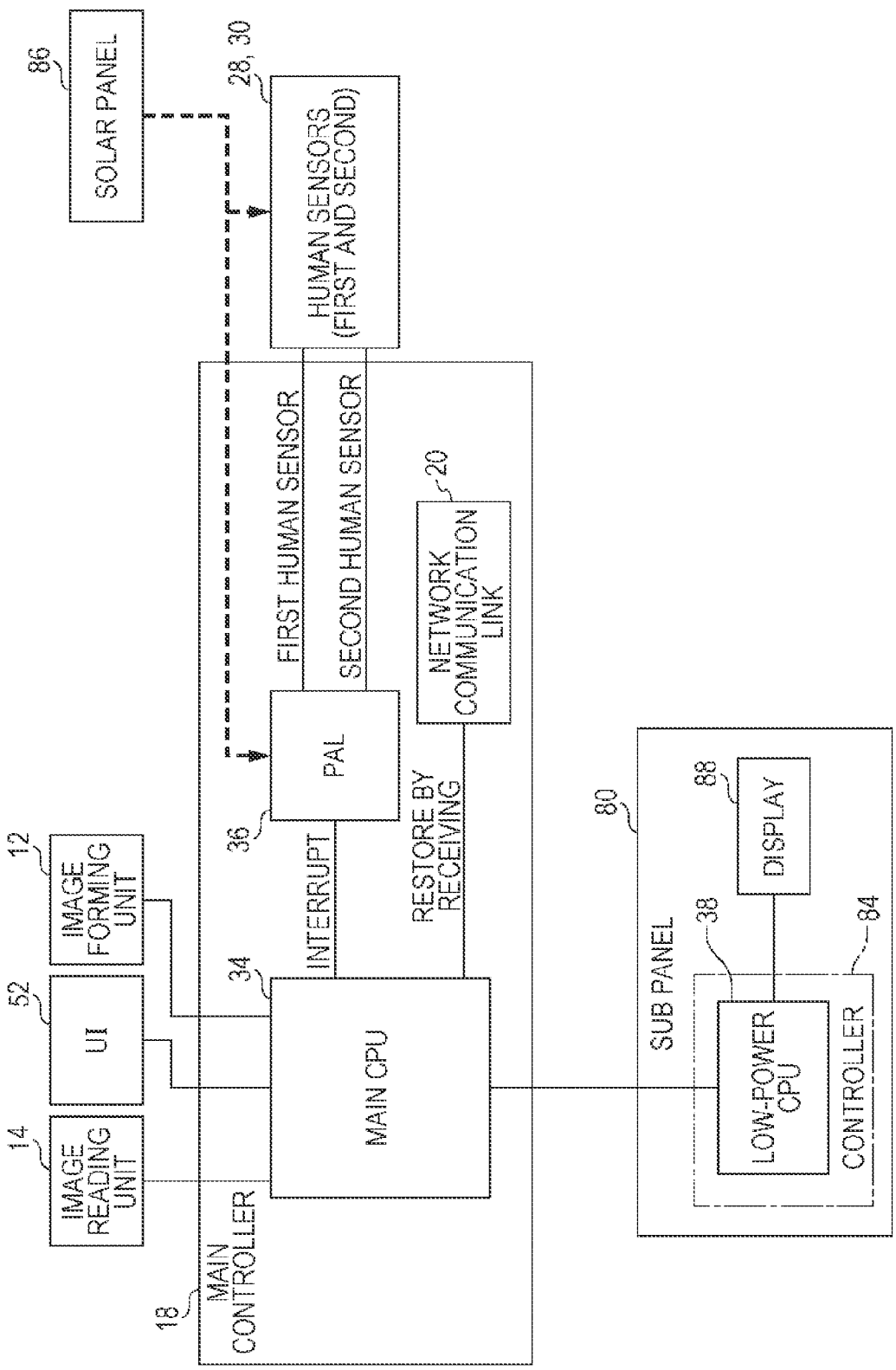
FIG. 4 is a block diagram illustrating a configuration of a main controller and a sub panel for computing and displaying an electric power value on the basis of the type and number of past examples occurring during a power saving mode in an image processing device according to an exemplary embodiment of the present invention.

FIG. 4 is a block diagram illustrating a configuration of the main controller 18 and the sub panel 80 for computing and displaying an electric power value on the basis of the type and number of past examples occurring during power saving mode in an image processing device according to an exemplary embodiment of the present invention.

The main controller 18 is equipped with a main CPU 34. As discussed earlier, the image reading unit 14, the UI 52, and the image forming unit 12 are respectively connected to and controlled by the main controller 18.

Although omitted from FIG. 3, the main controller 18 is connected to human sensors (the first human sensor 28 and the second human sensor 30) via programmable array logic (PAL), and is also connected to the network communication link 20.

In addition, although omitted from illustration in FIG. 3, electric power generated by the solar panel 86 is also supplied to the PAL 36 and the human sensors 28 and 30. Particularly, electric power generated by the solar panel 86 (or electric power generated and stored in the battery device 82) is supplied to the PAL 36 and the human sensors 28 and 30 during power saving mode.

Since the main CPU 34 is not required to directly sense information such as the number of times that a person is sensed by the first human sensor 28 and power is routed to the second human sensor 30, such information is counted by the PAL 36 without reactivating the main CPU 34. Subsequently, by transmitting an interrupt signal to the main CPU 34, the count result of the PAL 36 is reported to the main CPU 34. As a result, it becomes possible to detect an event count corresponding to an increase in the electric power value, without reactivating the main CPU 34. Note that the count result of the PAL 36 may configured so that an interrupt signal is issued to the main CPU 34 at a predetermined time interval (for example, the display period of the sub panel 80), or so that the main CPU 34 or a low-power CPU 38 acquires the count result of the PAL 36. Also, in the present exemplary embodiment, the PAL 36 is used to count power rise factors during power saving mode without causing the main CPU 34 to return from power saving mode, but another integrated circuit other than PAL, such as a programmable logic device (PLD), may also be used.

Meanwhile, the controller 84 of the sub panel 80 is made up of a low-power CPU 38, and is connected to the main CPU 34. For the low-power CPU 38, a CPU with lower power consumption than the main CPU 34 is implemented. Consequently, the processing performance of the low-power CPU 38 is less than the main CPU 34, and minimal processing is conducted.

Note that the main CPU 34 and the low-power CPU 38 are connected by a communication line (such as a universal asynchronous receiver/transmitter (UART), a System Management Bus (SMBus), or the System Packet Interface (SPI)), or by a signal line that reports a mode signal expressing the mode of the image processing device 10. Modes of the image processing device 10 may include a CPU off mode that turns off the main CPU 34, a semi-low mode that partially turns off power, and a 0 W mode that turns off all devices except the portion supplied by electric power from the solar panel 86, thus bringing power consumption to 0. Other modes may include, for example, a low-power mode that operates on low power, a copy standby mode that stands by ready to copy, a print mode that conducts image forming, and a scan mode that conducts image reading.

Electric power value computation methods for displaying an electric power value on the sub panel 80 in the configuration discussed above will now be described specifically.

(First Electric Power Value Computation Method)

Figure 5:
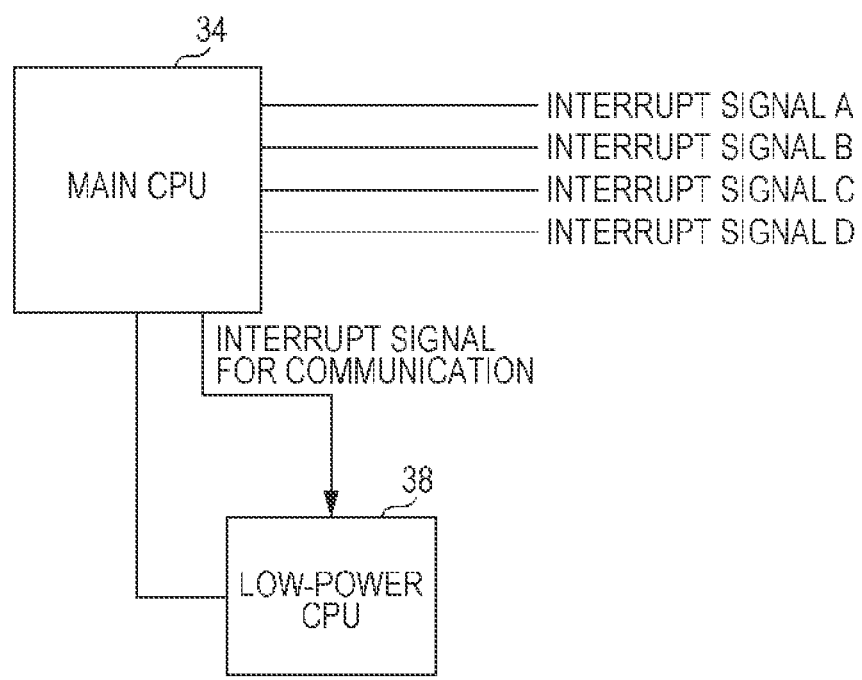
FIG. 5 is a diagram for explaining a first electric power value computation method that computes an electric power value during a power saving mode.

FIG. 5 is a diagram for explaining a first electric power value computation method that computes an electric power value during a power saving mode.

Multiple interrupt signals are input into the main CPU 34. For example, in the example of FIG. 5, interrupt signals A to D are input. The interrupt signals may be, for example, interrupt signals for activating the main CPU 34 in the case of the first human sensor 28 and the second human sensor 30 sensing a person, an interrupt signal for reporting the count result discussed above from the PAL 36, and an interrupt signal for various requests from the network communication link 20.

In the first electric power value computation method, when the main CPU 34 reactivates due to various interrupt signals in order to respond to an interrupt signal, the main CPU 34 communicates with the low-power CPU 38, and reports to the low-power CPU 38 what kinds of events (interrupt signals) occurred for the duration of the power saving mode. In other words, interrupt signals for communication are communicated by being reported from the main CPU 34 to the low-power CPU 38, and the count and types of interrupt signals while in power saving mode are reported from the main CPU 34 to the low-power CPU 38.

The low-power CPU 38 stores in advance a table of power consumption and a duration estimated for each type of interrupt signal, and thereby computes the power consumption per a predetermined time from the count of each type of interrupt signal reported from the main CPU 34. Subsequently, the computed power consumption is displayed on the display 88.

For example, as illustrated in FIG. 6A, consider the case of switching from the power consumption of normal operation to 0 (W) in a power saving mode, and sensing an interrupt signal A three times while in this state. In this case, if the power consumption value and duration estimated for each type of various interrupt signals are taken to be the values in the table illustrated in FIG. 6B, the amount of power consumption for each type of interrupt signal is computed from the power consumption value (X) and the duration (U) for that type of interrupt signal. Consequently, if the estimated amount of power consumption is multiplied by the count of interrupt signals, and divided by a sampling time (M), the value of the average power consumption may be computed. In other words, the interrupt signal count, multiplied by the electric power value estimated from the interrupt signal, multiplied by the estimated duration, and divided by the sampling time, becomes (3×X×U)/M, and a value of average power consumption per second is computed.

Herein, the display interval for display on the display 88 may be approximately 1 s, for example, whereas the reactivation of the main CPU 34 by an interrupt signal is shorter, and often a reactivation time on the order of several ms. The main CPU 34 conducts a process briefly, and then returns to power saving mode. For this reason, sampling the interrupt signals becomes beneficial for power saving.

In addition, in cases such as the main CPU 34 not reactivating for a fixed amount of time, a signal line for a mode signal may be connected between the main CPU 34 and the low-power CPU 38, while in addition, a table of power consumption values pre-estimated for each mode may be stored in advance. As a result, in the case of sensing a mode with a pre-established retention time, an electric power value pre-estimated according to the sensed mode may be displayed on the display 88 as the computation result.

Note that in the first electric power value computation method, the low-power CPU 38 computes an electric power value from the type and count of interrupt signals reported from the main CPU 34. However, the main CPU 34 may also be configured to compute an electric power value from the type and count of interrupt signal after returning from power saving mode due to an interrupt signal, and report the computation result to the low-power CPU 38. In this case, the table of power consumption values for each type of interrupt signal is stored on the main CPU 34 side.

(Second Electric Power Value Computation Method)

FIG. 7 is a diagram for explaining a second electric power value computation method that computes an electric power value during a power saving mode.

Multiple interrupt signals (including a mode signal) are input into each of the main CPU 34 and the low-power CPU 38. For example, in the example of FIG. 7, interrupt signals A to D are respectively input into the main CPU 34 and the low-power CPU 38 as the interrupt signals. Also, besides the various interrupt signal described in the first electric power value computation method, a mode signal or the like that expresses various modes is also input as an interrupt signal.

In the second electric power value computation method, the low-power CPU 38 monitors the interrupt signals on a fixed time interval, stores in advance a table of power consumption and a duration for each type of interrupt signal, and computes a value of the power consumption per a predetermined time from the monitoring result. Subsequently, the value of the computed power consumption is displayed on the display 88. The power consumption is computed and displayed as an average electric power per second, for example. Since the computation of the power consumption is basically the same as the first electric power value computation method, description is reduced or omitted.

In the second electric power value computation method, the low-power CPU 38 monitors the interrupt signals on a fixed time interval to compute an electric power value. For this reason, a time lag is not produced, but the number of signal lines is increased over the first electric power value computation method.

On the other hand, since the low-power CPU 38 computes an electric power value with just the directly input interrupt signals, without communicating with the main CPU 34 as in the first electric power value computation method, the second electric power value computation method is more advantageous than the first electric power value computation method from the perspective of minimizing increases in power consumption.

(Third Electric Power Value Computation Method)

FIG. 8 is a diagram for explaining a third electric power value computation method that computes an electric power value during a power saving mode.

The third electric power value computation method is compromise between the first electric power value computation method and the second electric power value computation method.

Multiple interrupt signals are input into the main CPU 34. For example, in the example of FIG. 8, interrupt signals A to D are input. For the interrupt signals, the various interrupt signals cited in the first electric power value computation method are input.

Additionally, interrupt signals are also input into the low-power CPU 38. For example, in the example of FIG. 8, the interrupt signal C and the interrupt signal D are input.

In other words, a portion of the multiple interrupt signals input into the main CPU 34 are also input into the low-power CPU 38.

For example, for the interrupt signals input into the main CPU 34 only, signals that change only when the main CPU 34 is active may be input, whereas other signals may be input as the interrupt signals that are input into both the main CPU 34 and the low-power CPU 38.

In the third electric power value computation method, when a mode other than the power saving mode reactivates the main CPU 34, for example, the main CPU 34 communicates with the low-power CPU 38, and reports to the low-power CPU 38 what kinds of events (interrupt signals that change when the main CPU 34 is active) occurred for the duration of the power saving mode. In other words, interrupt signals for communication are communicated by being reported from the main CPU 34 to the low-power CPU 38, and the count and types of interrupt signals while in power saving mode are reported.

The low-power CPU 38 stores in advance a table of power consumption and a duration for each type of interrupt signal, and thereby computes the power consumption from the types of interrupt signals. Subsequently, the computed power consumption is displayed on the display 88. The power consumption is computed and displayed as an average electric power per second, similarly to the first and second electric power value computation methods, for example.

Also, while in power saving mode, the low-power CPU 38 monitors the interrupt signal C and the interrupt signal D on a fixed time interval, stores in advance a table of power consumption for each type of interrupt signal, and computes the power consumption from the monitoring result. Subsequently, the computed power consumption is displayed on the display 88. For example, an average electric power value per second is computed and displayed from events on the signal line that indicates mode information.

Note that although the first to third electric power value computation methods discussed above are described as methods of computing an electric power value during power saving mode, in the case of a mode other than power saving mode, the main CPU 34 may compute an average power consumption from pre-estimated values of power consumption and durations for the currently operating mode, and report the computed average power consumption to the low-power CPU 38 for display on the display 88.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   at least one processor configured to compute, during a power saving mode that reduces power consumption, a power consumption per a predetermined time, using a count per type of an interrupt signal produced during the power saving mode, and a power consumption pre-estimated per type of the interrupt signal;
   a display configured to display a power consumption computed by the at least one processor; and
   a controller configured to keep a count of a power rise factor during the power saving mode that does not require reactivation from the power saying mode;
   wherein the at least one processor is configured to, in a case of a mode other than the power saving mode, instead of computing a power consumption using a count per type of the interrupt signal and a power consumption pre-estimated per type of the interrupt signal, compute a power consumption per a predetermined time during the power saying mode using a count per type of the interrupt signal, a power consumption pre-estimated per type of the interrupt signal, a count result of the controller, and a power consumption pre-estimated from the power rise factor.

2. The information processing device according to claim 1, wherein the display is configured to, in a case in which an interrupt signal of a mode with a pre-established retention time occurs, display a power consumption pre-estimated for the mode, without displaying a computation result of the at least one processor.

3. The information processing device according to claim 1, wherein the at least one processor is configured to, in the case of a mode other than the power saving mode, instead of computing a power consumption using a count per type of the interrupt signal and a power consumption pre-estimated per type of the interrupt signal, compute a power consumption from a pre-estimated electric power value and a duration of a currently operating mode.

4. The information processing device according to claim 2, wherein the at least one processor is configured to, in the case of a mode other than the power saving mode, instead of computing a power consumption using a count per type of the interrupt signal and a power consumption pre-estimated per type of the interrupt signal, compute a power consumption from a pre-estimated electric power value and a duration of a currently operating mode.

5. The information processing device according to claim 1, wherein the controller is configured to count the power rise factor with an integrated circuit capable of writing a logic circuit for counting the power rise factor.

6. An information processing method comprising:
   computing, by a computing unit, during a power saving mode that reduces power consumption, a power consumption per a predetermined time, using a count per type of an interrupt signal produced during the power saving mode, and a power consumption pre-estimated per type of the interrupt signal;
   displaying, by a display, a power consumption computed by the computing;
   keeping, by a controller, a count of a power rise factor during the power saving mode that does not require reactivation from the power saving mode: and
   in a case of a mode other than the power saving mode, instead of computing a power consumption using a count per type of the interrupt signal and a power consumption pre-estimated per type of the interrupt signal, computing, by the computing unit, a power consumption per a predetermined time during the power saving mode, using count per type of the interrupt signal, a power consumption pre-estimated per type of the interrupt signal, a count result of the controller, and a power consumption pre-estimated from the power rise factor.

7. An image processing device comprising:
an image processor equipped with at least one processing function from among:
   an image reading processing function for reading a document image;
   an image copying processing function that copies a document image read by the image reading processing function onto a printing sheet;
   an image forming function that forms an image onto a printing sheet using received image information; and
   an image information transmitting function that transmits information of a document image read by the image reading processing function;
a main controller that includes a controlling function that controls the image processor, in addition to a sensing function that senses a type and a count of an interrupt signal produced in a power saving mode that reduces power consumption, and outputs a sensing result in response to the interrupt signal;
a display configured to display a power consumption; and
at least one processor configured to operate on electric power, and using the sensing result output from the main controller and a power consumption pre-estimated per type of the interrupt signal, control, during the power saving mode, computation and display on the display of a power consumption per a predetermined time,
wherein the main controller is configured to keep a count of a power rise factor during the power saving mode that does not require reactivation from the power saving mode, and
wherein the at least one processor is configured to, in case of a mode other than the power saving mode, instead of computing a power consumption using the sensing result and a power consumption pre-estimated per type of the interrupt signal, control computation and display on the display of a power consumption per a predetermined time during the power saving mode, using a count per type of the interrupt signal, a power consumtion pre-estimated per type of the interrupt signal, a count result of the main controller, and a power consumption pre-estimated from the power rise factor.

8. An image processing device comprising:
an image processor equipped with at least one processing function from among:
   an image reading processing function for reading a document image;
   an image copying processing function that copies a document image read by the image reading processing function onto a printing sheet;
   an image forming function that forms an image onto a printing sheet using received image information; and
   an image information transmitting function that transmits information of a document image read by the image reading processing function;
a main controller that includes a controlling function that controls the image processor, in addition to an outputting function that senses a type and a count of an interrupt signal produced in a power saving mode that reduces power consumption, and in response to the interrupt signal, computes and outputs, during the power saving mode, a power consumption per a predetermined time, using a sensing result and a power consumption pre-estimated per type of the interrupt signal;
a display configured to display a power consumption; and
the at least one processor configured to operate on electric power, and to control display on the display of a power consumption output from the main controller,
wherein the main controller is configured to keep a count of a power rise factor during the power saving mode that does not require reactivation from the power saving mode, and
wherein the main controller is configured to, in a case of a mode other than the power saving mode, instead of computing a power consumption using the sensing result and a power consumption pre estimated per type of the interrupt signal, compute a power consumption per a predetermined time during the power saving mode, using a count per type of the interrupt signal, a power consumption pre-estimated per type of the interrupt signal, a count result of the main controller, and a power consumption pre-estimated from the power rise factor.

9. The information processing device according to claim 1, wherein the display is configured to display the computed power consumption using electric power provided by at least one of a solar panel or a battery.

10. The information processing device according to claim 1, wherein the at least one processor is configured to compute, during the power saving mode, the power consumption per the predetermined time, using a count per type of a plurality of different types of interrupt signals produced during the power saving mode, and a power consumption pre-estimated per type of the plurality of different types of interrupt signals.

* * * * *